(12) United States Patent
Nagahara et al.

(10) Patent No.: US 6,980,496 B2
(45) Date of Patent: Dec. 27, 2005

(54) INFORMATION RECORDING/REPRODUCING APPARATUS

(75) Inventors: Shinichi Nagahara, Tokorozawa (JP); Ryo Sato, Tokorozawa (JP); Ko Ishii, Tokorozawa (JP)

(73) Assignee: Pioneer Corporation, Tokyo (JP)

( * ) Notice: Subject to any disclaimer, the term of this patent is extended or adjusted under 35 U.S.C. 154(b) by 341 days.

(21) Appl. No.: 10/207,793

(22) Filed: Jul. 31, 2002

(65) Prior Publication Data

US 2003/0026179 A1   Feb. 6, 2003

(30) Foreign Application Priority Data

Jul. 31, 2001   (JP)   .............................. 2001-232820

(51) Int. Cl.$^7$ ............................................. G11B 7/095
(52) U.S. Cl. ................................ 369/44.37; 369/44.41
(58) Field of Search ..................... 369/44.37, 44.11, 369/44.24, 44.28, 44.23, 44.41, 112.04, 112.07

(56) References Cited

U.S. PATENT DOCUMENTS

| | | | | |
|---|---|---|---|---|
| 4,800,547 A | * | 1/1989 | Kessels et al. | 369/44.24 |
| 5,184,340 A | * | 2/1993 | Kachi et al. | 369/44.37 |
| 5,412,631 A | * | 5/1995 | Komma et al. | 369/44.37 |
| 5,909,418 A | * | 6/1999 | Noda et al. | 369/53.36 |
| 5,963,515 A | | 10/1999 | Shindo | |
| 6,016,300 A | | 1/2000 | Takeda et al. | |
| 6,400,664 B1 | * | 6/2002 | Shimano et al. | 369/44.37 |
| 2002/0101802 A1 | * | 8/2002 | Ogasawara et al. | 369/44.37 |
| 2002/0118611 A1 | * | 8/2002 | Kim et al. | 369/44.11 |
| 2004/0037177 A1 | * | 2/2004 | Buchler | 369/44.28 |

FOREIGN PATENT DOCUMENTS

| | | |
|---|---|---|
| EP | 0 643 387 A1 | 3/1995 |
| EP | 0 646 909 A1 | 4/1995 |
| EP | 0 766 235 A1 | 4/1997 |
| EP | 1 093 119 A2 | 4/2001 |
| EP | 1 113 426 A2 | 7/2001 |
| JP | 05 325216 A | 12/1993 |
| JP | 2001-110071 | 4/2001 |

* cited by examiner

Primary Examiner—Brian E. Miller
Assistant Examiner—Peter Vincent Agustin
(74) Attorney, Agent, or Firm—Nixon & Vanderhye, PC (57) ABSTRACT

An information recording/reproducing apparatus includes an optical device, a photo-detector and a calculation unit. The optical device irradiates light beams, including one main beam and at least two sub-beams with respect to an information recording medium. The photo-detector receives return lights of the main beam and sub-beams to output light detection signals. The calculation unit produces a tracking error signal and a position information signal based on the light detection signals. The optical device irradiates the at least two sub-beams onto positions shifted to opposite sides of a center of the guide track, respectively, when the main beam is being irradiated onto a center of the information recording track. Thus, the apparatus produces the tracking error signal and the position information signal by utilizing a common optical system and a common signal processing system and thereby executes tracking servo control and random access processing with high accuracy.

19 Claims, 8 Drawing Sheets

INFORMATION RECORDING/REPRODUCING APPARATUS

BACKGROUND OF THE INVENTION

1. Field of the Invention

The present invention belongs to a technical field of information recording apparatus that records information on an information recording medium such as a CD-R (Compact disc-Recordable), a DVD-R (DVD-Recordable), or a DVD-RW (DVD-Rewritable) and information recording/reproducing apparatus that reproduces information from such an information recording medium. Particularly, the present invention relates to a tracking servo technique and a control of movement of a light beam at the time of random access, etc.

2. Description of Related Art

As an information recording medium on which additional writing or rewriting information is possible, there are known an optical disc such as a CD-R, a DVD-R, and a DVD-RW. On each of those information recording media, tracks for recording information (called "information recording track" or "groove") and lands for guiding the light beam (called "guide track" or "land") are spirally alternately formed in the manner adjoining with each other. On the track for recording information, contents information such as video information and/or audio information can be optically recorded. Also, the guide track is provided to cause the light beam to correctly follow the information recording track, especially in a non-recorded area of the disc.

When recording information on the information recording medium or reproducing information from the information recording medium, it is needed to accurately position the light beam on the information recording track. Therefore, in the information recording/reproducing apparatus, the tracking servo control is performed.

In a differential push-pull method known as a representative tracking servo technique, one main beam is irradiated onto the information recording track and two sub-beams are irradiated onto the adjoining guide tracks on both sides of the information recording track on which the main beam is irradiated. The return lights of the light beams irradiated onto the respective tracks are received by a two-divided or four-divided type photo-detector. Push-pull signals corresponding to the three beams are produced to the electric signals output from the photo-detector. After adjusting the signal amplitude based on the difference in quantity of light beams between the main beam and each of the sub-beams, the sum of the push-pull signals corresponding to the sub-beams is subtracted from the push-pull signal corresponding to the main beam, thereby a differential tracking error signal is obtained. The servo control circuit controls the position of the light beam from the pickup so that this differential tracking error signal becomes zero, thereby causing the light beam to trace the information recording track. In this way, the light beam for recording or reproducing information is so controlled as to be exactly positioned on the information recording track.

In such an information recording/reproducing apparatus, so-called "random access processing" (recording/reproduction) can be performed. The "random access processing" is a processing for changing the information recording or reproducing position on the information recording medium. In other words, it means that, during recording or reproduction with respect to an information recording track of the information recording medium, according to the user's command or else, the light beam is moved to another information recording track to perform recording or reproduction with respect to the information recording track after the movement. In this case, as the processing of the information recording/reproducing apparatus, the above-described tracking servo control is once made ineffective, the optical pickup is moved to the vicinity of a target information recording track on the information recording medium, the tracking servo control is restarted to position the light beam on the target information recording track, and then the recording or reproduction is restarted.

When moving the optical pickup to the vicinity of the target information recording track, generally the number of the tracks that the light beam traversed in the radial direction of the information medium is counted by referring to the tracking signal. The radial contrast signal is produced according to the amplitude or else of an RF signal obtained by moving the light beam in the radial direction of the information recording medium, and it basically indicates the fluctuation in the amplitude of the RF signal depending upon the cross-sectional shape or configuration in the radial direction of the information recording medium. The light beam is moved to the vicinity of the target track by counting the tracking signals and, when closing the tracking servo loop, the position of the light beam with respect to the target track is detected by using the tracking signal and radial contrast signal. Thereby, the light beam is appropriately positioned on the target track and tracking servo loop is smoothly closed.

At this time, if information has already been recorded on the information recording medium, the RF signal is obtained by moving the light beam in the radial direction of the information recording medium, and hence the radial contrast signal is clearly obtained. However, since no clear RF signal is obtained in the non-recorded area of the information recording medium, there is the problem that it is difficult to obtain a radial contrast signal whose amplitude distinctly changes.

For this reason, the inventors of the present invention previously proposed a method of obtaining clear radial contrast signal even in a non-recorded area. Specifically, in the information recording/reproducing apparatus using a 3-beam type optical pickup, two sub-beams are irradiated onto the positions on the information recording medium shifted from a center position of the guide track to obtain, even in a non-recorded area, clear radial contrast signals indicating the configuration of the information recording tracks and the guide tracks. This method is disclosed in Japanese Patent Application No. 11-290225 (Laid-Open under No. 2001-110071) and Japanese Patent Application Laid-Open under No. 2001-110071.

In order to execute the above-described random access processing, it is necessary to obtain a radial contrast signal with high accuracy. On the other hand, in order to perform ordinary recording or reproduction, it is necessary to obtain the above-described tracking error signal (i.e., the differential push-pull signal) with high accuracy. Therefore, it is required to meet both of those requirements in the information recording/reproducing apparatus.

However, as stated above, when adopting the method of irradiating the sub-beams at the position shifted from the center of the guide track, an offset or the like is generated correspondingly to the amount of the shift, with the result that the accuracy of the tracking error signal decreases.

In order to obtain a highly accurate tracking error signal by using the differential push-pull method, it is most appropriate that the two sub-beams have the phases shifted by 180 degrees from each other, i.e., when the main beam is located at the center of the information recording track, the two sub-beams are located on the center of the guide tracks adjacent, on both sides, to the recording track on which the main beam is located. However, if this condition is met, it is impossible to obtain a satisfactory radial contrast signal in the non-recorded area as stated above.

On the other hand, if the two sub-beams are irradiated in the manner being shifted from the center of the guide tracks as in the case of the above-mentioned patent applications, although a preferable radial contrast signal is obtained even in the non-recorded area of information, it inconveniently results that the level of the tracking error signal obtained by the differential push-pull method becomes insufficient, or the accuracy of the tracking error signal is lowered due to the occurrence of an offset, etc.

However, providing separate optical systems in order to obtain a preferable tracking error signal and a preferable radial contrast signal leads to the increase of cost, the increase in size, and the complicated structure, of the apparatus, and hence is not practical. Accordingly, it is preferable to satisfy the both requirements by making use of a single optical system and signal processing system in an information recording/reproducing apparatus.

SUMMARY OF THE INVENTION

The present invention has been made in view of the above-described points in problem, and has an object to provide an information recording/reproducing apparatus that, by utilizing a common optical system and signal processing system, produces a tracking error signal and position information signal to execute a tracking servo control and a random access processing with high accuracy.

According to one aspect of the present invention, there is provided an information recording/reproducing apparatus including: an optical device which irradiates light beams, including one main beam and at least two sub-beams, with respect to an information recording medium on which information recording tracks and guide tracks are alternately formed; a photo-detector which receives return lights of the main beam and sub-beams from the information recording medium to output light detection signals; and a calculation unit which produces a tracking error signal indicating an irradiation position of the main beam with respect to the information recording track and a position information signal indicating a position of the main beam relative to an alignment direction of the information recording tracks and the guide tracks on the information recording medium, based on the light detection signals, wherein the optical device irradiates the at least two sub-beams onto positions shifted to opposite sides of a center of the guide track, respectively, when the main beam is being irradiated onto a center of the information recording track.

In the above information recording/reproducing apparatus, the optical device produces one main beam and the at least two sub-beams, which are irradiated onto the information recording medium. The main beam is the one for recording information on the information recording track, or reproducing information from the information recording track. Also, the sub-beams are the ones that are irradiated onto the guide track and are used for positioning the main beam on the information recording track. The sub-beams are irradiated onto the positions that are shifted to opposite sides from the center of the guide track when the main beam is being irradiated onto the center of the information recording track. The return lights obtained by the main beam and sub-beams being reflected by the information recording medium enter the photo-detector, whereby the electric signals that are proportionate to their quantities of light are output. By executing prescribed calculation processing on the detection signals corresponding to the two sub-beams irradiated onto the positions shifted to the opposite sides of the center of the guide track, it is possible to accurately produce the tracking error signal and the position information signal. It is noted that, the tracking error signal described herein includes a signal called "differential push-pull signal" while the position information signal described herein includes a signal called "radial contrast signal".

The optical device may irradiate the at least two sub-beams onto the positions shifted to opposite sides of the center position of the guide track by equal distances.

According to this specific feature, by executing calculation such as addition, subtraction, etc. with respect to the detection signal of the sub-beams shifted, by equal distances, from the center position of the guide track, it is possible to simultaneously obtain the signal corresponding to the center position of the guide track and the signal corresponding to the positions shifted from the center position of the guide track. It is thereby possible to produce by calculation the suitable signals for producing the tracking error signal and the position information signal.

The optical device may irradiate the at least two sub-beams onto one of the guide tracks adjacent to the information recording track on which the main beam is being irradiated. Also, the optical device may irradiate one of the at least two sub-beams onto one of the guide tracks adjacent to the information recording track on which the main beam is being irradiated, and irradiate the other of the at least two sub-beams onto the other of the guide tracks adjacent to the information recording track on which the main beam is being irradiated.

The optical device may irradiate the two sub-beams on one of the guide tracks adjacent to the information recording track, on which the main beam is being irradiated, at the positions respectively shifted by equal quantities from the center of the one guide track, and irradiates the two sub-beams on the other of the guide tracks adjacent to the information recording track, on which the main beam is being irradiated, at the positions shifted from the center of the other guide track by equal quantities.

According to this feature, by detecting the return lights of the two sub-beams irradiated onto the one guide track and the two sub-beams irradiated onto the other guide track, multiple signals that have prescribed phase relationship with respect to the main beam are obtained. By performing prescribed calculations with respect to those signals, it is possible to obtain an excellent tracking error signal and position information signal.

The optical device may include a grating having two diffraction gratings having grating directions different from each other, and the optical device may irradiate the two sub-beams produced by one of the diffraction gratings onto the one and the other of the guide tracks and irradiates the two sub-beams produced by the other of the diffraction gratings onto the one and the other of the guide tracks. According to this feature, by using the grating based on the combinations of the two diffraction gratings, it is possible to easily obtain the desired sub-beams.

The sub-beams may be ±1st order diffracted lights produced by the diffraction gratings. Also, the optical device may include a diffraction grating, and the sub-beams may be ±1st order diffracted lights and ±2nd order diffracted lights produced by the diffraction gratings.

The photo-detector may include a first detection element which receives the return lights of the two sub-beams irradiated onto the one guide track, a second detection element which receives the return light of the main beam, and a third detection element which receives the return lights of the two sub-beams irradiated onto the other guide track. According to this feature, it is possible to obtain the detection signals corresponding to the main beam and sub-beams through the use of the multiple detection elements.

The calculation unit may perform prescribed calculations by using a first and a second push-pull signals respectively corresponding to the two sub-beams irradiated onto the one guide track, a third push-pull signal corresponding to the main beam, and a fourth and a fifth push-pull signals respectively corresponding to the two sub-beams irradiated onto the other guide track, so as to produce the tracking error signal and the position information signal.

According to this feature, by performing the calculations with respect to the detection signals obtained from the main beam and sub-beams, it is possible to obtain an accurate tracking error signal and position information signal without making the configuration of the optical device complicated.

In a preferred embodiment, the calculation device may include: a unit which subtracts, from the third push-pull signal, a signal produced by multiplying a sum signal of the first push-pull signal, the second push-pull signal, the fourth push-pull signal and the fifth push-pull signal by a prescribed value of coefficient, to produce the tracking error signal; and a unit which calculates a difference signal between the difference signal of the first push-pull signal and the second push-pull signal and the difference signal of the fourth push-pull signal and the fifth push-pull signal, to produce the position information signal.

According to this feature, by performing simple addition, subtraction, and multiplication with respect to the detection signals obtained from the main beam and sub-beams, it is possible to easily obtain an excellent tracking error signal and position information signal.

According to another aspect of the present invention, there is provided an information recording/reproducing apparatus including: an optical device which irradiates light beams including one main beam on an information recording medium on which information recording tracks and guide tracks are alternately formed; a photo-detector which receives return lights corresponding to the light spots from the information recording medium to output light detection signals; and a calculation unit which produces a tracking error signal indicating an irradiation position of the main beam with respect to the information recording track and a position information signal indicating a position of the main beam relative to an alignment direction of the information recording tracks and the guide tracks on the information recording medium, based on the light detection signals, wherein the optical device includes a grating including two diffraction gratings having grating directions different from each other, and wherein the optical device irradiates, onto the guide tracks, the first and the second sub-beams produced by one of the diffraction gratings and the third and the fourth sub-beams produced by the other of the diffraction gratings.

In accordance with the above information recording/reproducing apparatus, the optical device produces one main beam and four sub-beams, which are irradiated with respect to the information recording medium. The optical device includes a grating having two diffraction gratings having grating directions different from each other, whereby the first and second sub-beams are produced by one of the diffraction gratings and the third and fourth sub-beams are produced by the other of the diffraction gratings, and these beams are irradiated onto the guide tracks. The return lights obtained by the main beam and sub-beams being reflected by the information recording medium enter the photo-detector device and the electric signals that are proportionate to their quantities of light are output therefrom. By performing prescribed calculations with respect to the detection signals corresponding to the main beam and four sub-beams, the tracking error signal and position information signal can be accurately produced.

One diffraction grating may diffract a half portion of the light beam from a light source to produce the first and the second sub-beams, and the other diffraction grating may diffract the remaining half portion of the light beam from the light source to produce the third and the fourth sub-beams.

According to this feature, the return lights of the first and second sub-beams can be led to the different positions on the detector device and it does not happen that the return lights overlap with each other on the detector. Similarly, the return lights of the third and fourth sub-beams do not overlap with each other on the detector. Accordingly, it is possible to accurately obtain the detection signals of the first and fourth sub-beams, whereby it is possible to produce an accurate tracking error signal and position information signal.

The first and the second sub-beams, and the third and the fourth sub-beams, may be irradiated onto positions symmetrical with respect to the center of the guide track.

As a result of this, by determining the appropriate calculation method according to the phase relationship between the positions of the respective sub-beams and performing that calculation processing, it is possible to obtain the tracking error signal and position information signal.

The photo-detector may include a first to a fourth 2-divided light detection elements which receive the first to the fourth sub-beams, respectively. By this, it is possible to receive the return lights of the respective sub-beams independently, and to obtain accurate detection signals.

According to still another aspect of the present invention, there is provided an information recording/reproducing apparatus including: an optical device which irradiates a main beam on an information recording track of an information recording medium on which information recording tracks and guide tracks are alternatively formed and irradiates four sub-beams on the guide tracks so as to form corresponding light spots; a photo-detector which receives return lights corresponding to the light spots from the information recording medium to output light detection signals; and a calculation unit which produces a tracking error signal indicating a radiation position of the main beam with respect to the information recording track and a position information signal indicating a position of the main beam with respect to an alignment direction of the information recording track and the guide track on the information recording medium, based on the light detection signals.

In accordance with the above information recording/reproducing apparatus, the optical device produces one main beam and four sub-beams, which are irradiated onto the information recording medium. The return lights obtained by the main beam and sub-beams being reflected by the information recording medium enter the photo-detector device, and electric signals proportionate to their quantities of light are output therefrom. By performing prescribed calculations with respect to the detection signals corresponding to the main beam and four sub-beams, the tracking error signal and position information signal can be accurately produced through the execution of simple calculation processing.

The nature, utility, and further features of this invention will be more clearly apparent from the following detailed description with respect to preferred embodiment of the invention when read in conjunction with the accompanying drawings briefly described below.

DESCRIPTION OF THE PREFERRED EMBODIMENTS

Hereinafter, a preferred embodiment of the present invention will be explained with reference to the accompanying drawings.

Figure 1:
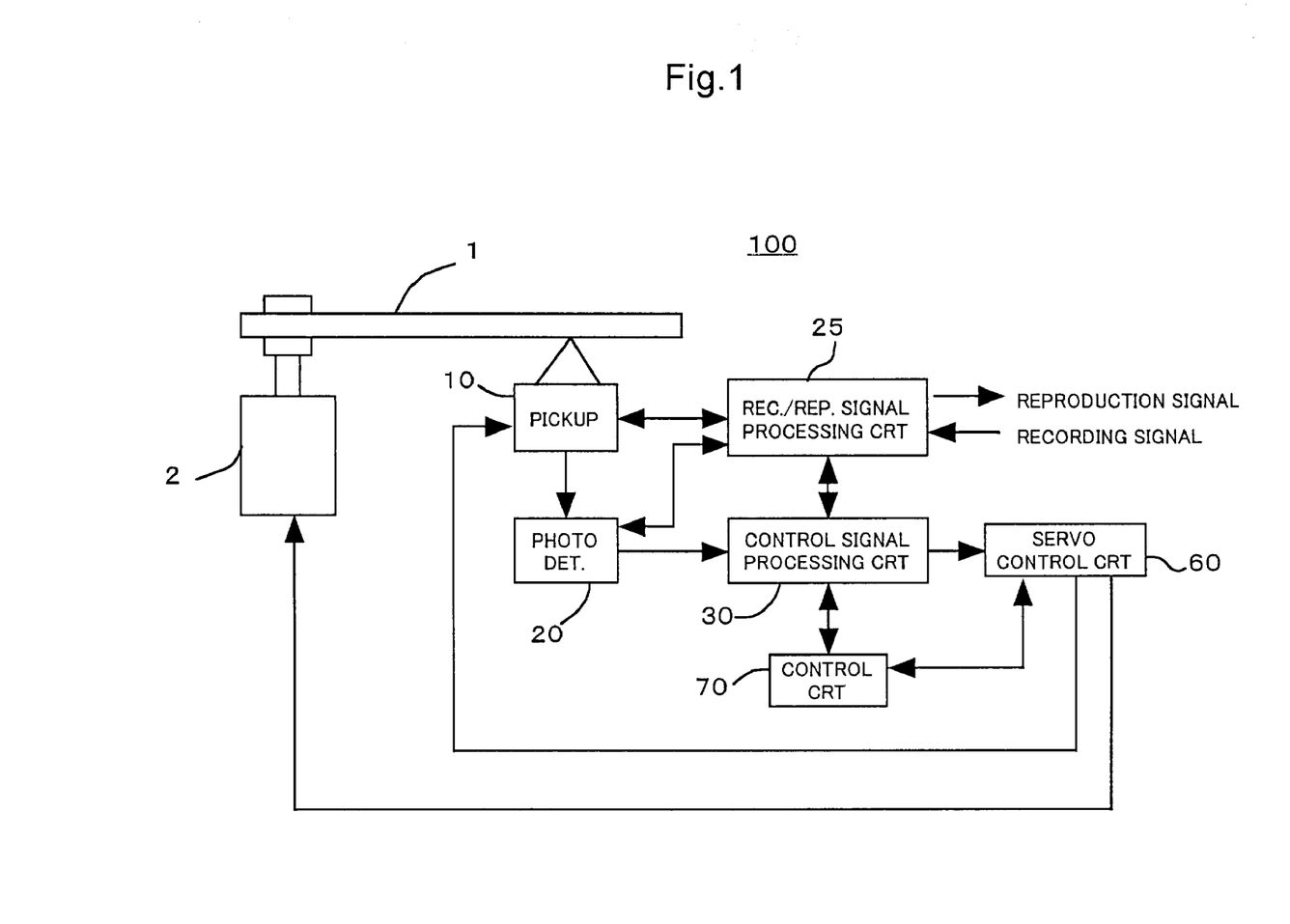
FIG. 1 is a block diagram illustrating the entire configuration of an information recording/reproducing apparatus according to an embodiment of the present invention.

FIG. 1 illustrates a schematic configuration of an information recording/reproducing apparatus according to an embodiment of the present invention. The information recording/reproducing apparatus 100 of the present invention records information on a disc 1 serving as an information recording medium and reproduces information from the disc 1. A representative example of the disc 1 is an optical disc such as a CD-R, a DVD-R, or a DVD-RW, on which information is additionally written or rewritten. However, the application of the present invention is not limited to these discs.

As illustrated in FIG. 1, the information recording/reproducing apparatus 100, when roughly classified, includes a spindle motor 2, an optical pickup 10, a photo-detector 20, a recording/reproducing signal processing circuit 25, a control signal processing circuit 30, a servo control circuit 60, and a control circuit 70.

First, the respective elements are briefly explained. The spindle motor 2 rotates the disc 1 with a prescribed linear velocity. The optical pickup 10 irradiates a light beam, functioning as a recording beam or a reproducing beam, onto an information recording surface of the disc 1, and guides return lights from the information recording surface to the photo-detector 20. The photo-detector 20 converts the return lights from the optical pickup 10 into detection signals that are electric signals corresponding to the quantity of the received light and supplies the electric signals to the recording/reproducing signal processing circuit 25 and the control signal processing circuit 30. It is noted that the photo-detector 20 may be incorporated within the optical pickup 10.

When recording information with respect to the disc 1, the recording/reproducing signal processing circuit 25 receives a recording signal and performs necessary coding processing, modulation processing and the like, and outputs the resulting signal to the optical pickup 10. When performing reproduction of information from the disc 1, the recording/reproducing signal processing circuit 25 performs necessary decoding processing, D/A conversion processing and the like for the detection signal supplied from the photo-detector 20, and outputs the resulting signal to a video output part or audio output part (not illustrated), as a reproduction signal.

The control signal processing circuit 30 receives detection signals from the photo-detector 20 and produces control signals (i.e., error signals) for tracking servo control, focus servo control, etc., and outputs the control signals to the servo control circuit 60 and to the control circuit 70. The servo control circuit 60 receives the error signals, such as a tracking error signal, focus error signal, etc., from the control signal processing circuit 30, and, according to the error signals, produces drive control signals for driving the spindle motor 2 and the optical pickup 10, and outputs them to the spindle motor 2 and to the pickup 10, respectively.

The control circuit 70 may include, for example, a CPU (Central Processing Unit) and an MPU (Micro Processing Unit) and, according to the program that has been prepared beforehand, performs a general and over-all control of the respective constituent elements within the information recording/reproducing apparatus 100.

Figure 2:
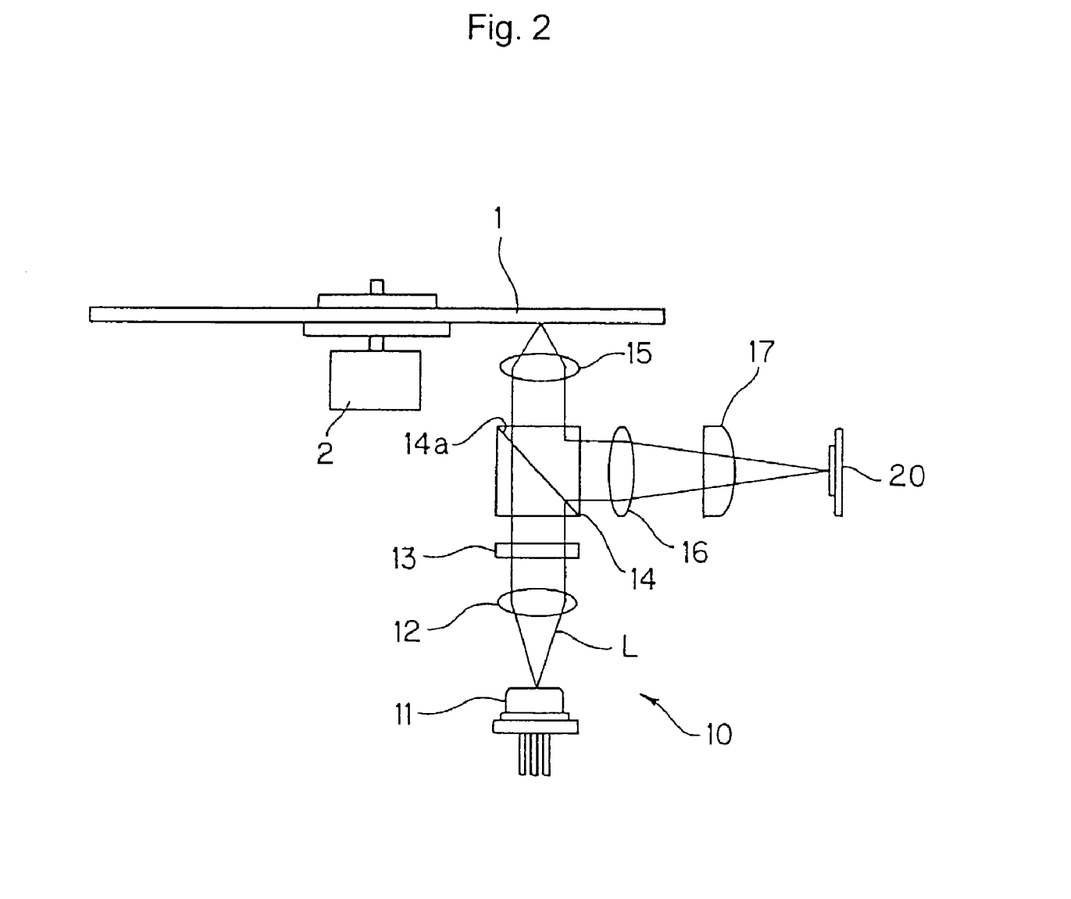
FIG. 2 is a diagram schematically illustrating a configuration of the optical pickup illustrated in FIG. 1.

Next, an explanation will be given, in detail, of the configurations and operations of the respective elements. FIG. 2 illustrates a configuration of the optical pickup 10. The optical pickup 10 includes a laser diode 11, a collimator lens 12, a grating 13, a beam splitter 14, an objective lens 15, a collimator lens 16, and a cylindrical lens 17.

The laser diode 11 is a light source of the recording and reproducing light beams, and emits a light beam. The collimator lens 12 makes the light beam emitted from the laser diode 11 a parallel light beam, and transmits it to the grating 13.

Figure 4A:
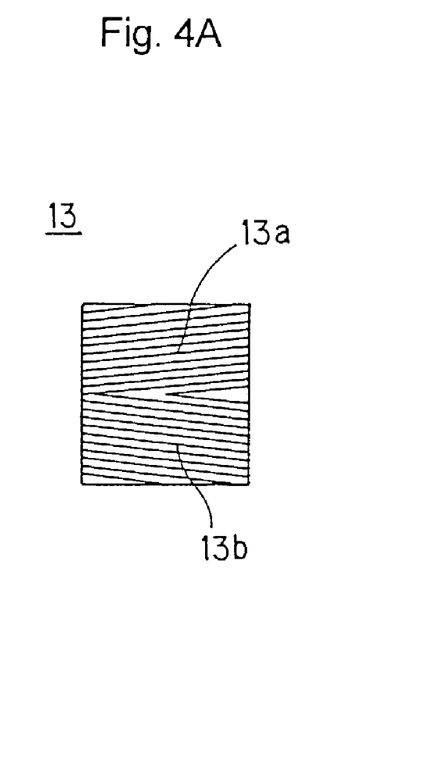
FIG. 4A is a plan view of the grating provided within the pickup according to the present invention.

An example of the grating 13 is illustrated in FIG. 4A. The grating 13 has a structure wherein two diffraction grating parts 13a and 13b are combined with each other. The grating parts 13a and 13b each have slit-like grating elements formed thereon, the directions of which have different angles with respect to the light beam when viewed in the vertical direction in FIG. 4A. Therefore, the light beam that has entered the grating 13 is divided into five light beams.

Figure 4B:
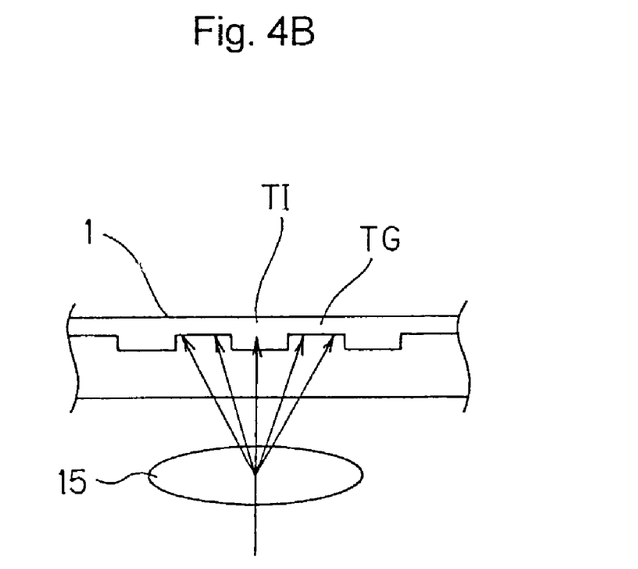
FIG. 4B is a view illustrating the function of the objective lens.

These five light beams pass through the beam splitter 14 and go straightforward and are condensed by the objective lens 15 to be irradiated on the information recording surface (the lower surface in FIG. 2) of the disc 1. At this time, as illustrated in FIG. 4B, the five light beams produced by the grating 13 are irradiated onto the information recording surface of the disc 1, and thereby the five light spots are formed on the information recording surface.

The light beams reflected by the disc 1 (hereinafter also called "return light") again pass through the objective lens 15 to enter the beam splitter 14, and are reflected by a half mirror 14a of the beam splitter 14 and are guided to the collimator lens 16. The collimator lens 16 and the cylindrical lens 17 introduce astigmatism necessary for the focus control based on the astigmatism method to the return lights from the beam splitter 14, and guide the return lights to a light receiving surface of the photo-detector 20.

In this way, when recording information, the light beam that has been modulated to the intensity corresponding to the information to be recorded is irradiated onto the disc 1, thereby the information is recorded onto the information recording track on the information recording surface of the disc 1. Also, when reproducing information, the information that is recorded on the information recording track on the disc 1 is read out by the return light, and that information is converted by the photo-detector 20 into electric signals.

Figure 3:
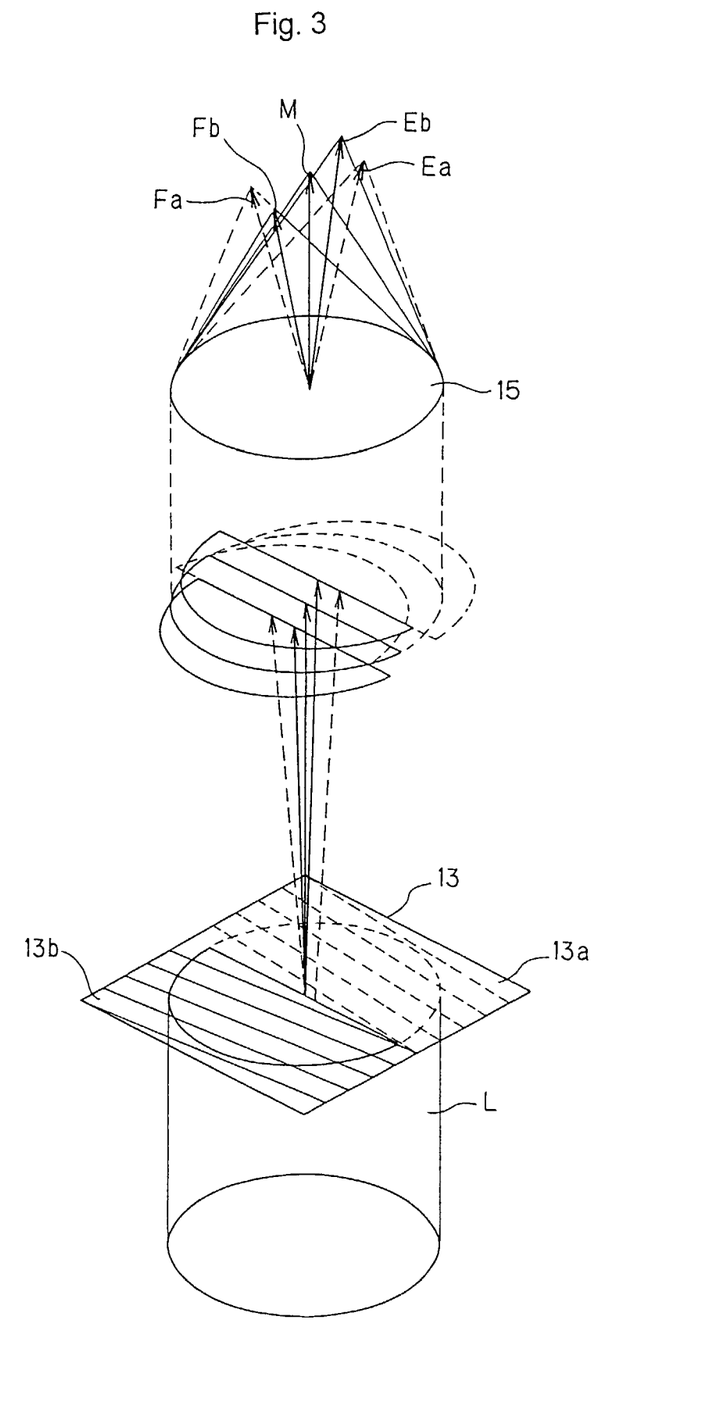
FIG. 3 is a view illustrating the function of a grating provided within the pickup according to the present invention.

FIG. 3 schematically illustrates the manner of the light beam being divided by the grating 13. The incident light L that enters the grating 13 is divided into five light beams by the grating 13. Specifically, the grating 13 causes the emission of five, in total, light beams, including the 0th order diffracted light, the ±1st order diffracted lights produced by the grating part 13a, and the ±1st order diffracted light produced by the grating part 13b. While the objective lens 15 condenses these five light beams, since they enter the objective lens 15 at different angles, the five different light spots are formed on the information recording surface of the disc 1.

Figure 5A:
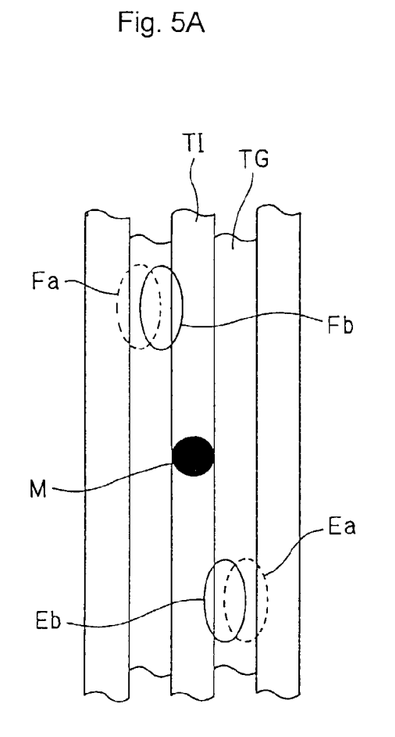
FIGS. 5A and 5B are views illustrating the states on the optical disc, and on the photo-detector, of the light spots according to the present invention.

FIG. 5A illustrates the relative positional relationship among the five light spots formed on the information recording surface of the disc 1 according to this embodiment. As illustrated in FIG. 5A, the 0th order diffracted light of the grating 13 is condensed by the objective lens 15 to form a light spot M; the ±1st order diffracted lights by the grating part 13a are condensed by the objective lens 15 to form the light spots Fa and Ea; and the ±1st order diffracted lights by the grating part 13b are condensed by the objective lens 15 to form the light spots Fb and Eb. The light spot M is used as a main beam and the other four light spots Fa, Fb, Ea, and Eb are used as sub-beams (also called "the guide beams"). By adjusting the positional relationship of the grating 13 with respect to the laser diode 11 that is a light source (i.e., the angle of each of the grating parts 13a and 13b of the grating 13), it is possible to adjust the relative positional relationship among the five light spots formed on the information recording surface of the disc 1.

In this embodiment, as illustrated in FIG. 5A, when the light spot M of the main beam is located on the information recording track TI, the remaining four light spots Fa, Fb, Ea, and Eb are formed at the positions that are respectively shifted by prescribed amounts from the center of the neighboring guide tracks TG.

In the example of FIG. 5A, the light spots Fa and Ea of the ±1st order diffracted lights by the grating part 13a of the grating 13 are each shifted outward from the center lines of the guide tracks TG on both sides of the information recording track TI where the light spot M of the main beam is located. Also, the light spots Fb and Eb of the ±1st order diffracted lights by the grating part 13b of the grating 13 are each shifted outward from the center lines of the guide tracks TG on both sides of the information recording track TI where the light spot M of the main beam is located. Further, the light spots Fa and Fb are shifted to respectively opposite sides from the center line of the same guide track TG by equal distances, with that center line of the guide track TG being regarded as the axis of symmetry. Also, the light spots Ea and Eb are shifted to respectively opposite sides from the center line of the same guide track TG by equal distances, with that center line of the guide track TG being regarded as the axis of symmetry.

The return lights from the light spots M, Fa, Fb, Ea, and Eb formed on the information recording surface of the disc 1 enter the photo-detector 20 by passing through the objective lens 15, beam splitter 14, collimator lens 16 and cylindrical lens 17 as illustrated in FIG. 2.

Figure 5B:
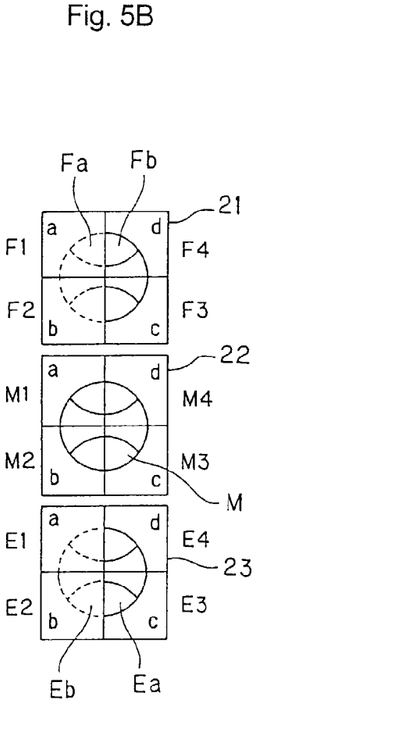

FIG. 5B illustrates respective configurations of the light receiving elements of the photo-detector 20. The photo-detector 20 has three light receiving elements 21, 22 and 23. The light receiving element 21 receives the return lights from the light spots Fa and Fb of the sub-beams; the light receiving element 22 receives the return light from the light spot M of the main beam; and the light receiving element 23 receives the return lights from the light spots Ea and Eb of the sub-beams. In the optical pickup 10 of this embodiment, since astigmatism is introduced to the return lights for performing the focus control, the return lights are guided to the light receiving elements 21 to 23 with its direction being rotated by 90 degrees. Each of the light receiving elements 21 to 23 has four-divided detection surfaces.

The light receiving surfaces 21a and 21b of the light receiving element 21 receive the return light of the light spot Fa, and the light receiving surfaces 21c and 21d of the light receiving element 21 receive the return light of the light spot Fb. The light receiving surfaces 22a to 22d of the light receiving element 22 receive the return light of the light spot M. Incidentally, the reason why the light receiving element 22 for receiving the return light of the main beam is divided into four parts is that, by utilizing the light receiving element 22, a focus error signal needs to be produced from the return light of the light spot M of the main beam by the astigmatism method. Also, the light receiving surfaces 23a and 23b of the light receiving element 23 receive the return light of the light spot Ea, and the light receiving surfaces 23c and 23d of the light receiving element 23 receive the return light of the light spot Eb. And, each of the respective light receiving surfaces 21a to 21d, 22a to 22d, and 23a to 23d outputs an electric signal corresponding to the quantity of the received light.

Figure 6:
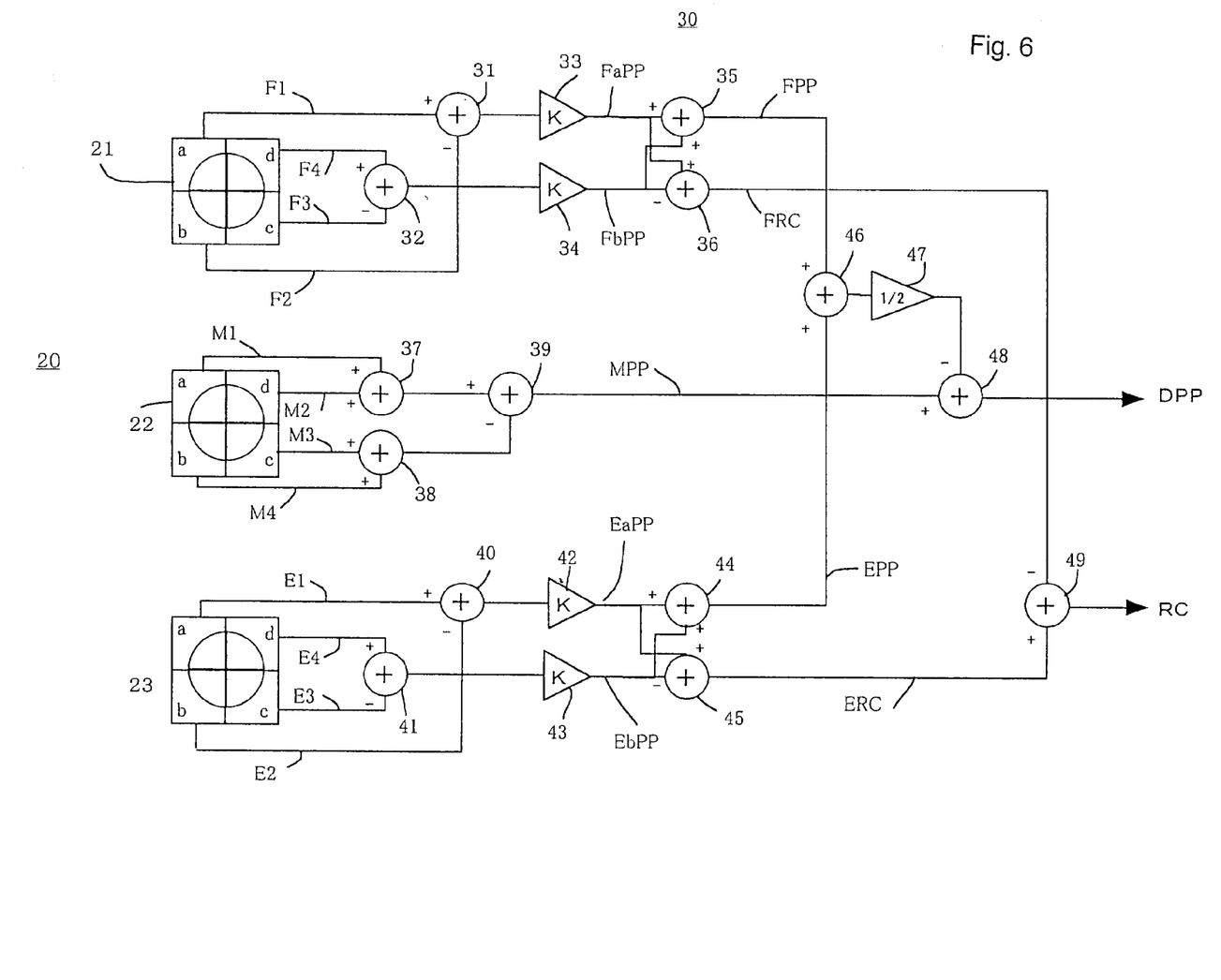
FIG. 6 is a view illustrating an example of a control signal processing circuit illustrated in FIG. 1.
Figure 7:
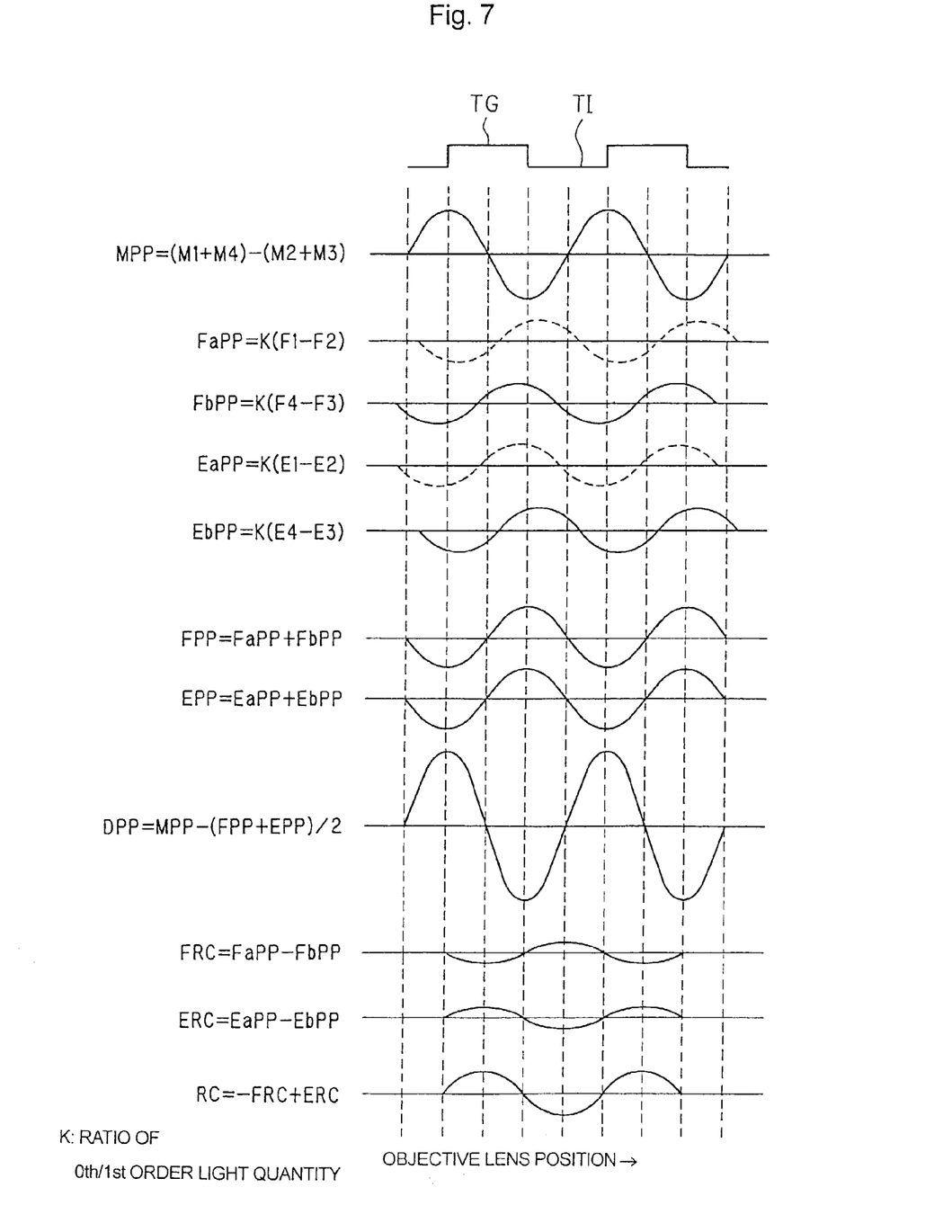
FIG. 7 shows waveforms of the control signal of respective parts in the processing circuit illustrated in FIG. 6.

FIG. 6 illustrates the configurations of the photo-detector 20 and the control signal processing circuit 30. It is to be noted that, while the control signal processing circuit 30 produces various kinds of control signals such as a focus error signal, a tracking error signal, etc., FIG. 6 illustrates only the parts for producing a differential push-pull signal (tracking error signal) and a radial contrast signal as the parts having particular relevance to the present invention. Other control signals such as a focus error signal can be produced using a known method. FIG. 7 illustrates the signal waveforms at the respective points in FIG. 6.

As shown in FIG. 6, the control signal processing circuit 30 includes a plurality of adders and a plurality of amplifiers. Regarding the light receiving element 21 of the photo-detector 20 for processing the light spots Fa and Fb of the sub-beams, the output signal F2 of the light receiving surface 21b is subtracted by an adder 31 from the output signal F1 of the light receiving surface 21a, and the amplifier 33 amplifies the resulting signal with an amplification factor K, thereby to produce a push-pull signal FaPP corresponding to the light spot Fa. Similarly, the output signal F3 of the light receiving surface 21c is subtracted by an adder 32 from the output signal F4 of the light receiving surface 21d, and the amplifier 34 amplifies the resulting signal with an amplification degree K thereby to produce a push-pull signal FbPP corresponding to the light spot Fb. An adder 35 adds up the push-pull signal FaPP and the push-pull FbPP thereby to produce a push-pull signal FPP. An adder 36 subtracts the push-pull signal FbPP from the push-pull signal FaPP thereby to produce a first radial contrast signal FRC.

Regarding the light receiving element 23 of the photo-detector 20 for processing the light spots Ea and Eb of the sub-beams, the same calculation processing is performed. Namely, the output signal E2 of the light receiving surface 23b is subtracted by an adder 40 from the output signal E1 of the light receiving surface 23a, and the amplifier 42 amplifies the resulting signal with an amplification degree K thereby to produce a push-pull signal EaPP corresponding to the light spot Ea. Similarly, the output signal E3 of the light receiving surface 23c is subtracted by an adder 41 from the output signal E4 of the light receiving surface 23d, and the amplifier 43 amplifies the resulting signal with an amplification degree K thereby to produce a push-pull signal EbPP corresponding to the light spot Eb. An adder 44 adds up the push-pull signal EaPP and the push-pull EbPP thereby to produce a push-pull signal EPP. An adder 45 subtracts the push-pull signal EbPP from the push-pull signal EaPP thereby to produce a second radial contrast signal ERC.

On the other hand, regarding the light receiving element 22 of the photo-detector 20 for processing the light spot M of the main beam, an adder 37 adds up the output signal M1 of the light receiving surface 22a and the output signal M4 of the light receiving surface 22d and supplies the resulting signal to an adder 39. Also, an adder 38 adds up the output signal M2 of the light receiving surface 22b and the output signal M3 of the light receiving surface 22c and supplies the resulting signal to the adder 39. The adder 39 subtracts the output signal of the adder 38 from the output signal of the adder 37 thereby to produce a push-pull signal MPP.

Next, from the push-pull signal FPP, the push-pull signal EPP, the first radial contrast signal FRC, the second radial contrast signal ERC and the push-pull signal MPP, the tracking error signal (differential push-pull signal) DPP and the radial contrast RC are produced in the following manner. Namely, an adder 46 adds up the push-pull signal FPP and the push-pull signal EPP, and the resulting signal is multiplied by ½ by an amplifier 47. The resulting signal output from the amplifier 47 is subtracted by an adder 48 from the push-pull signal MPP to produce the differential push-pull signal DPP.

Also, an adder 49 subtracts the first radial contrast signal FRC from the second radial contrast signal ERC to produce the radial contrast signal RC. It is noted that the radial contrast signal RC may be produced by subtracting the second radial contrast signal ERC from the first radial contrast signal FRC, because its polarity may be arbitrarily set to be either positive or negative according to its circuit design.

As illustrated in FIG. 7, according to this embodiment, each of the differential push-pull signal and the radial contrast signal thus produced have clear amplitude. With the conventional method already mentioned, it was difficult to excellently produce both of the differential push-pull signal and the radial contrast signal. Namely, in order to obtain an excellent differential push-pull signal, it is preferable to locate the sub-beams on the center lines of the guide tracks (namely, to make the main beam and sub-beam have a phase difference of 180 degrees). However, if that is so done, the accuracy of the radial contrast is likely to decrease in the non-recorded area of the disc. On the other hand, in order to obtain an excellent radial contrast signal, it is preferable to locate the sub-beams at positions deviated from the center lines of the guide tracks (for example, as in the case of the above-described Japanese Patent Application Laid-Open No. 2001-110071). However, if that is so done, it becomes difficult to obtain an excellent differential push-pull signal.

For that reason, according to one technical idea of the present invention, it has been determined to use two sub-beams instead of the conventional one sub-beam. Namely, in FIG. 5A, the novel idea of the present invention is that, the light spots Fa and Fb are used instead of the conventional one sub-beam, and the light spots Ea and Eb are used instead of another one sub-beam. On the information recording surface of the disc 1, these four sub-beams are irradiated so that the pair of the light spots Fa and Fb and the pair of the light spots Ea and Eb are formed at the positions equidistantly shifted to mutually opposite sides, with the center lines of the guide tracks being set as the axes of symmetry. It is noted that, in terms of phase, this is equivalent to shifting the phases of the light spots Fa and Fb in opposite directions by the same phase-shift amount.

It is one of the characterizing features of the present invention to obtain an excellent differential push-pull signal and an excellent radial contrast signal by executing the calculation processing explained above in connection with FIGS. 6 and 7 with respect to the detection signal of the return light from the four light spots formed on the disc in the above-described way. As a result of this, it becomes possible to excellently produce both the differential push-pull signal and the radial contrast signal by utilizing a single optical system and a single signal processing system.

Next, studies will be made of the grating used in the present invention. In the above-described embodiment, by utilizing the grating having the different grating parts 13a and 13b such as those illustrated in FIG. 4A, one set of sub-beams is formed by each of the grating part 13a and the grating part 13b. As illustrated in FIG. 3, the grating 13 is configured such that the semi-circular portion of the incident light L is diffracted by the grating part 13a and the remaining semi-circular portion is diffracted by the grating part 13b, respectively, to produce the ±1st order diffracted lights. As a result of this, as illustrated in FIG. 5A, the light spots Fa and Fb are formed closely to each other and the light spots Ea and Eb are formed closely to each other, on the information recording surface of the optical disc. Accordingly, between the light spots Fa and Fb and between the light spots Ea and Eb, the phase relationship therebetween is stable, and it is unlikely to be affected by the above-described effect of the eccentricity or else of the disc.

Also, the use of the grating 13 illustrated in FIG. 4A provides such an advantage that the return lights from the light spots Fa and Fb basically do not overlap with each other on the detection surface of the photo-detector. Similarly, the return lights from the light spots Ea and Eb do not overlap with each other on the detecting surface of the photo-detector. Accordingly, the detection accuracy of the return lights is improved. The reason for this is as follows. Namely, as illustrated in FIG. 3, two light spots Fa and Fb or two light spots Ea and Eb are respectively formed from the semi-circular portions of the incident light L. On the information recording surface of the optical disc, the mated light spots overlap each other as illustrated in FIG. 5A. However, in a state where the respective return lights reach the photo-detector as illustrated in FIG. 5B, those light spots again posses the original relationship between the mated semi-circular light portions and enter the separate detection elements, respectively. Namely, the return light of the spot Fa enters the detection surfaces 21a and 21b while the return light of the spot Fb enters the detection surfaces 21c and 21d, and hence they do not overlap with each other. Like this, by using the grating having two different grating directions such as that illustrated in FIG. 4A, the effect of the eccentricity or the like of the disc is eliminated, and, in addition, it becomes unnecessary to separate the return light on the photo-detector. This brings about the advantage that necessary signals can be obtained with excellent accuracy.

It is to be noted that, in actuality, when the astigmatism method is used for the focus control as in the case of this embodiment, since the beam of the return light entering the photo-detector rotates, there is, strictly, a case where a very small degree of overlapping occurs between the return lights. However, that is practically an almost ignorable extent. Further, when utilizing a method other than the astigmatism method for the purpose of focus control, no overlapping occurs.

Next, a modification of the above-described embodiment will be explained. In the above-described embodiment, five light spots are formed on the disc. However, according to the present invention, it is possible to produce the differential push-pull signal and the radial contrast signal if three beams, i.e., the main beam and one set of (two) sub-beams, are produced by one of the grating parts 13a and 13b of the grating 13. Namely, if there are the return lights of the three spots: the combination of the light spots M, Fa and Fb or the combination of the light spots M, Ea and Eb, it is possible to obtain the differential push-pull signal and radial contrast signal.

For example, when using the three spots, i.e., the light spots M, Fa and Fb, the signals E1 to E4 become zero in the respective equations in FIG. 7, with the result that the differential push-pull signal DPP=MPP−FPP. Thus, the differential push-pull signal having correct waveform is obtained. Also, regarding the radial contrast signal as well, it results that RC=−FRC, and therefore it is possible to obtain the radial contrast signal of correct waveform. The same applies to the case of using the three spots, i.e., the light spots M, Ea and Eb.

Similarly, as another combination of the sub-beams, it is also possible to utilize the combination of three beams, i.e., the combination of the light spots M, Fa and Eb, or the combination of the light spots M, Ea and Fb. In terms of phase, although the light spots Fa and Eb are remote from each other on the information recording surface, their phases are shifted by the same shift amount, in opposite directions, from the phase corresponding to the center line of the guide track. The relationship between the phases of those light spots Fa and Eb therefore is the same as that between the phases of the light spots Fa and Fb. That relationship also applies to that between the light spots Ea and Fb as well.

However, the combination of the light spots M, Fa and Eb, or the combination of the light spots M, Ea and Fb are more likely to be affected by the eccentricity of the disc.

Using the combination of, for example, the light spots Fa and Eb, or the light spots Ea and Fb, i.e. the combination of the light spots distant from each other, the phase relationship between those distant light spots inconveniently becomes unstable due to the effect of the eccentricity or the like of the disc. Resultantly, there is the possibility that the desired signals are not obtained. For this reason, it is preferable to use the light spots positioned closely to each other, namely the light spots Fa and Fb or the light spots Ea and Eb. However, if the effect of the eccentricity or else of the disc can be suppressed within a permissible range, it is also possible to use the combination of the light spots M, Fa and Eb, or the combination of the light spots M, Ea and Fb.

Figure 8A:
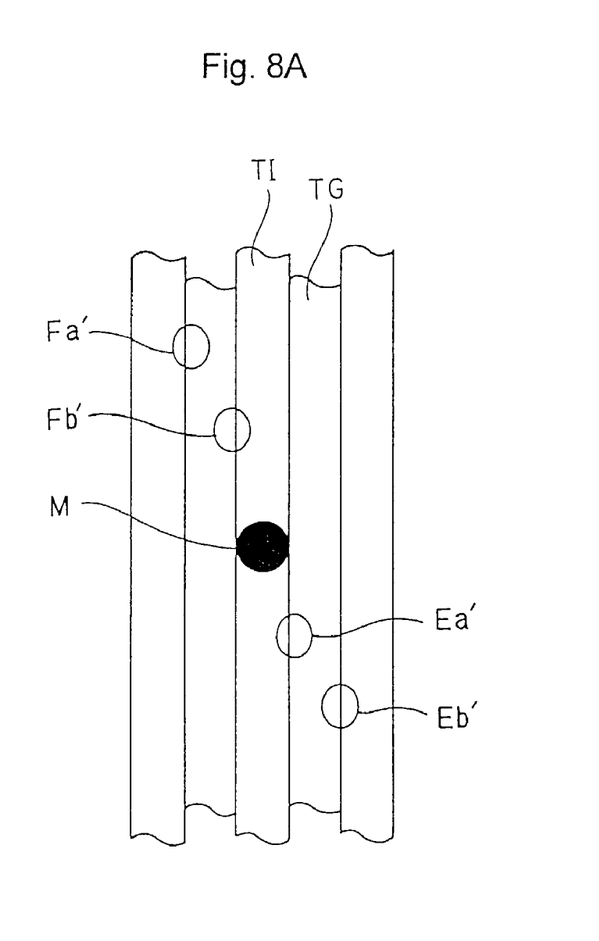
FIGS. 8A and 8B are views illustrating a modified example of the present invention, FIG. 8A being a view illustrating a formed state of light spots on the optical disc.
Figure 8B:
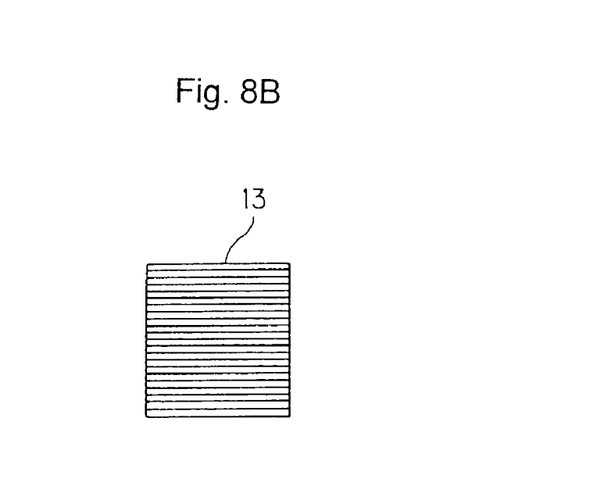

Also, if the effect of the eccentricity or else of the disc can be suppressed to be within a permissible range, it is also possible to use five light spots that are arranged on a straight line, for example, as illustrated in FIG. 8A. When using these light spots, the 0th order diffracted light, ±1st order diffracted lights and ±2nd diffracted lights may be produced by using a general type diffraction grating (see FIG. 8B) that has a single grating direction, and the diffracted lights thus produced are irradiated onto the information recording surface of the optical disc. Also in that case, by performing the calculations utilizing the light spots M, Fa', Fb', Ea' and Eb' previously explained referring to FIGS. 6 and 7, it is possible to obtain the differential push-pull signal and radial contrast signal.

As described above, according to the present invention, by irradiating two sub-beams in such a way that their light spots are displaced from the center position of the same guide track and by calculating each of those return light beams, it is possible to obtain a differential push-pull signal and a radial contrast signal with high accuracy.

In addition, by using the grating having two different grating directions, it is possible to eliminate the effect of the eccentricity or else of the disc and thereby to obtain the differential push-pull signal and the radial contrast signal with high accuracy.

The invention may be embodied on other specific forms without departing from the spirit or essential characteristics thereof. The present embodiments therefore to be considered in all respects as illustrative and not restrictive, the scope of the invention being indicated by the appended claims rather than by the foregoing description and all changes which come within the meaning an range of equivalency of the claims are therefore intended to embraced therein.

The entire disclosure of Japanese Patent Applications No. 2001-232820 filed on Jul. 31, 2001 including the specification, claims, drawings and summary is incorporated herein by reference in its entirety.

What is claimed is:

1. An information recording/reproducing apparatus comprising:
   an optical device which irradiates light beams, including one main beam and at least two sub-beams, with respect to an information recording medium on which information recording tracks and guide tracks are alternately formed;
   a photo-detector which receives return lights of the main beam and sub-beams from the information recording medium to output light detection signals; and
   a calculation unit which produces a tracking error signal indicating an irradiation position of the main beam with respect to the information recording track and a position information signal indicating a position of the main beam relative to an alignment direction of the information recording tracks and the guide tracks on the information recording medium, based on the light detection signals,
   wherein the optical device irradiates two sub-beams on one of the guide tracks adjacent to the information recording track, on which the main beam is being irradiated, at positions respectively shifted by equal quantities from the center of the one guide track, and irradiates two sub-beams on the other of the guide tracks adjacent to the information recording track, on which the main beam is being irradiated, at positions shifted from the center of the other guide track by equal quantities.

2. An information recording/reproducing apparatus according to claim 1, wherein the optical device includes a grating comprising two diffraction gratings having grating directions different from each other, and wherein the optical device irradiates two sub-beams produced by one of the diffraction gratings onto the one and the other of the guide tracks and irradiates two sub-beams produced by the other of the diffraction gratings onto the one and the other of the guide tracks.

3. An information recording/reproducing apparatus according to claim 2, wherein the sub-beams comprise ±1st order diffracted lights produced by the diffraction gratings.

4. An information recording/reproducing apparatus according to claim 2, wherein the optical device comprises a diffraction grating, and wherein the sub-beams comprise ±1st order diffracted lights and ±2nd order diffracted lights produced by the diffraction gratings.

5. An information recording/reproducing apparatus according to claim 1, wherein the photo-detector includes a first detection element which receives the return lights of the two sub-beams irradiated onto the one guide track, a second detection element which receives the return light of the main beam, and a third detection element which receives the return lights of the two sub-beams irradiated onto the other guide track.

6. An information recording/reproducing apparatus according to claim 1, wherein the calculation unit performs prescribed calculations by using first and second push-pull signals respectively corresponding to the two sub-beams irradiated onto the one guide track, a third push-pull signal corresponding to the main beam, and fourth and fifth push-pull signals respectively corresponding to the two sub-beams irradiated onto the other guide track, so as to produce the tracking error signal and the position information signal.

7. An information recording/reproducing apparatus according to claim 6, wherein the calculation unit comprises:
a unit which subtracts, from the third push-pull signal, a signal produced by multiplying a sum signal of the first push-pull signal, the second push-pull signal, the fourth push-pull signal and the fifth push-pull signal by a prescribed value, to produce the tracking error signal; and
a unit which calculates a difference signal between a difference signal of the first push-pull signal and the second push-pull signal and a difference signal of the fourth push-pull signal and the fifth push-pull signal, to produce the position information signal.

8. An information recording/producing apparatus according to claim 1, wherein the optical device irradiates the two sub-beams on the one of the guide tracks on one side in a tangential direction of the information recording medium with respect to the main beam and irradiates the two sub-beams on the other of the guide tracks on the other side in the tangential direction of the information recording medium with respect to the main beam.

9. An information recording/reproducing apparatus according to claim 8, wherein the two sub-beams on the one of the guide tracks are partly overlapped with each other on the one of the guide track, and the two sub-beams on the other of the guide tracks are partly overlapped with each other on the other of the guide tracks.

10. An information recording/reproducing apparatus comprising:
an optical device which irradiates light beams including one main beam on an information recording medium on which information recording tracks and guide tracks are alternately formed;
a photo-detector which receives return lights corresponding to the light spots from the information recording medium to output light detection signals; and
a calculation unit which produces a tracking error signal indicating an irradiation position of the main beam with respect to the information recording track and a position information signal indicating a position of the main beam relative to an alignment direction of the information recording tracks and the guide tracks on the information recording medium, based on the light detection signals,
wherein the optical device comprises a grating comprising two diffraction gratings having grating directions different from each other,
wherein the optical device irradiates, onto the guide tracks, first and second sub-beams produced by one of the diffraction gratings and third and fourth sub-beams produced by the other of the diffraction gratings,
wherein the first and the third sub-beams are irradiated onto positions symmetrical with respect to the center of one of the guide tracks, and the second and the fourth sub-beams are irradiated onto positions symmetrical with respect to the center of another of the guide tracks.

11. An information recording/producing apparatus according to claim 10, wherein the one diffraction grating diffracts a half portion of the light beam from a light source to produce the first and the second sub-beams, and the other diffraction grating diffracts the remaining half portion of the light beam from the light source to produce the third and the fourth sub-beams.

12. An information recording/reproducing apparatus according to claim 11, wherein the photo-detector comprises first to fourth 2-divided light detection elements which receive the first to the fourth sub-beams, respectively.

13. An information recording/reproducing apparatus according to claim 10, wherein the optical device irradiates the first and the third sub-beams on the one of the guide tracks on one side in a tangential direction of the information recording medium with respect to the main beam and irradiates the second and the fourth sub-beams on the other of the guide tracks on the other side in the tangential direction of the information recording medium with respect to the main beam.

14. An information recording/reproducing apparatus according to claim 13, wherein the first and the third sub-beams are partly overlapped with each other on the one of the guide tracks, and the second and the fourth sub-beams on the other of the guide tracks are partly overlapped with each other on the other of the guide tracks.

15. An apparatus for recording and/or reproducing information comprising:
an optical device which irradiates light beams onto an information recording medium comprising an information recording track arranged between first and second guide tracks, the light beams including a main light beam irradiated onto the information recording track, two first sub-beams irradiated onto the first guide track at symmetrically disposed positions on opposite sides of an axis of the first guide track, and two second sub-beams irradiated onto the second guide track at symmetrically disposed positions on opposite sides of an axis of the second guide track;
a photodetector which receives return lights of the main beam, the first sub-beams, and the second sub-beams from the information recording medium and outputs light detection signals; and
a calculation unit which produces, based on the light detection signals, one or both of a tracking error signal and a position information signal,
wherein the axis of the first guide track corresponds to a center axis of the first guide track and the axis of the second guide track corresponds to a center axis of the second guide track.

16. An apparatus according to claim 15, wherein the optical device comprises:

a light source; and a grating for dividing light from the light source into light beams for the main light beam, the two first sub-beams, and the two second sub-beams.

17. An apparatus according to claim 16, wherein the light beam for the main beam corresponds to 0th order diffracted light from the grating, the light beams for one of the first sub-beams and one of the second sub-beams correspond to ±1st order diffracted light from a first grating part of the grating comprising slits having a first orientation relative to the light from the light source, and the light beams for the other of the first sub-beams and the other of the second sub-beams correspond to ±1st order diffracted light from a second grating part of the grating comprising slits having a second orientation relative to the light from the light source, the second orientation being different than the first orientation.

18. An apparatus for recording and/or reproducing information comprising:

an optical device which irradiates light beams onto an information recording medium comprising an information recording track arranged between first and second guide tracks, the light beams including a main light beam irradiated onto the information recording track, two first sub-beams irradiated onto the first guide track at symmetrically disposed positions on opposite sides of an axis of the first guide track, and two second sub-beams irradiated onto the second guide track at symmetrically disposed positions on opposite sides of an axis of the second guide track;

a photodetector which receives return lights of the main beam, the first sub-beams, and the second sub-beams from the information recording medium and outputs light detection signals; and a calculation unit which produces, based on the light detection signals, one or both of a tracking error signal and a position information signal, wherein the calculation unit produces the tracking error signal and the position information signal based on first and second push-pull signals respectively corresponding to the two first sub-beams, a third push-pull signal corresponding to the main beam, and fourth and fifth push-pull signals respectively corresponding to the two second sub-beams.

19. An apparatus according to claim 18, wherein the calculation unit comprises:

a unit which subtracts, from the third push-pull signal, a signal produced by multiplying a sum signal of the first push-pull signal, the second push-pull signal, the fourth push-pull signal and the fifth push-pull signal by a specified value, to produce the tracking error signal; and a unit which calculates a difference signal between a difference signal of the first push-pull signal and the second push-pull signal and a difference signal of the fourth push-pull signal and the fifth push-pull signal, to produce the position information signal.

* * * * *